United States Patent

[11] 3,599,197

| [72] | Inventor | George Boyko |
| | | Framingham, Mass. |
| [21] | Appl No | 733,673 |
| [22] | Filed | May 31, 1968 |
| [45] | Patented | Aug. 10, 1971 |
| [73] | Assignee | Pinkerton's, Incorporated |
| | | New York, N.Y. |

[54] ELECTROMAGNETIC MOVING OBJECT DETECTION SYSTEM UTILIZING A COAXIAL LINE RESONATOR
7 Claims, 3 Drawing Figs.

[52] U.S. Cl. .................................................. 340/258,
330/56, 331/96, 331/101, 334/45, 343/8
[51] Int. Cl. .................................................... G08b 13/22,
G01s 9/44, H03f 3/60
[50] Field of Search.......................................... 340/258,
258 A, 258 C; 343/8; 330/56; 331/96, 97, 101;
334/4; 325/8, 23

[56] References Cited
UNITED STATES PATENTS

| 2,202,699 | 5/1940 | Leeds | 325/33 X |
| 2,809,285 | 10/1957 | Gottier | 325/23 |
| 3,007,158 | 10/1961 | Ellis | 325/23 X |
| 2,859,434 | 11/1958 | Auer, Jr et al | 343/8 |
| 3,210,752 | 10/1965 | Bojko | 340/258 |
| 3,246,266 | 4/1966 | Racy | 331/101 X |
| 3,270,292 | 8/1966 | Harwood | 334/45 X |
| 3,440,650 | 4/1969 | Kimball | 340/258 X |

Primary Examiner—John W Caldwell
Assistant Examiner—Perry Palan
Attorney—Russell, Chittick & Pfund ABSTRACT: A continuous wave, electromagnetic moving object detection system which responds to impedance changes in the antenna circuit produced by motion of an object through the area protected by the system. Increased sensitivity for a given level of radiated power and isolation of the oscillator circuitry from the detuning effects of changes in the protection environment are achieved by utilizing a coaxial line resonator. Alarm means actuated by detection of the impedance changes are employed to give an electrical, visual and/or audible indication of the presence of a moving object within the protected area.

INVENTOR.
GEORGE BOYKO
BY
Russell, Chittick & Pfund

ELECTROMAGNETIC MOVING OBJECT DETECTION SYSTEM UTILIZING A COAXIAL LINE RESONATOR

CROSS-REFERENCES TO RELATED APPLICATIONS

The subject matter of the present application is related to the "Plural Chambered, Oscillator-Coaxial Line Resonator-Detector Assembly for Moving Object Detection Systems and the Alarm System" described in my copending applications Ser. No. 733,672, filed May 31, 1968 and Ser. No. 733,671, filed May 31, 1968, respectively.

BACKGROUND OF THE INVENTION

The present invention relates to moving objects detection systems and, more particularly, to a continuous wave, electromagnetic moving object detection system which senses changes in the impedance of the system's antenna circuit produced by an object moving through the protected area.

Moving object detection systems of the general type are familiar to those skilled in the detection art. Representative examples of such systems include Chapin, U.S. Reissue Pat. No. 25,100 and Bojko, U.S. Pat. Nos. 3,210,752 and 3,237,191. The Chapin patent describes a continuous wave, electromagnetic system in which the returned energy from an object combines in the radiator impedance with oscillation energy being continuously supplied to the radiator to produce a new voltage-current ratio or impedance. The resultant voltage is the vector sum of the voltages developed by the reflected signal and the oscillator across the antenna impedance. When an object within the radiation field moves towards or away from the radiator, the phase of the reflected signal will vary with respect to the phase of the transmitted signal. The phase variations between the two voltages produce corresponding changes in the phase of the resultant voltage and, therefore in the impedance of the radiator. The impedance changes are detected and used to produce an alarm signal which actuates a suitable alarm means.

Various means are described in the Chapin patent for sensing motion produced changes in the antenna impedance including, measurement of RF antenna current, rectification of the combined reflected and transmitted signals and phase measurement. In addition, changes in the potentials and currents of the coupled oscillator circuit can be used to monitor corresponding changes in the impedance of the antenna.

In the prior art systems, the continuous wave oscillator was normally tightly coupled to the antenna circuit to obtain maximum radiated power and a level of sensitivity which would provide a practical detection range for the system. However, it was an unavoidable concommitant of the tightly coupled oscillator-antenna circuit that changes in the antenna impedance substantially affected the operating frequency of the oscillator.

The impedance changes and the corresponding changes in the oscillator frequency occurred each time the physical position of the antenna was altered with respect to the protection environment and whenever a signal was reflected from a moving object. The frequency shift caused by a change in the physical position of the antenna could be compensated for by retuning the oscillator. However, the frequency compensation was achieved at the sacrifice of the alarm system's sensitivity to moving objects. Moreover, in view of the relatively strict governmental frequency allocations for electromagnetic detection systems, frequency tuning of the oscillator in the field was not considered to be a desirable procedure because of the requirements for accurate frequency determining equipment and a necessarily high level of technical competence in the field service personnel.

Other problems were also encountered in prior art systems utilizing a relatively tight coupling between the oscillator and antenna circuits. For instance, if a crystal detector was employed to sense changes in the antenna impedance caused by a moving object, the detector responded primarily to shifts in the oscillator frequency rather than to the desired changes in antenna impedance.

It is accordingly a general object of the present invention to provide a continuous wave, electromagnetic moving object detection system which overcomes the limitations of the prior art systems.

It is a specific object of the present invention to provide a continuous wave, moving object detection system in which the oscillator circuit is substantially unaffected by impedance changes in the antenna circuit.

It is another object of the present invention to provide an object detection system which has greater sensitivity than existing object detection systems. It is a feature of the invention that the increased sensitivity is achieved at substantially lower power level requirements than those imposed by existing systems.

It is still another object of the present invention to provide an object detection system which reduces the possibility of outside interference producing false alarms.

In the accomplishment of these objects, I employ a solid-state, continuous wave, sinusoidal oscillator that is very loosely coupled to a high Q, "coaxial line" resonator. The resonator, together with a capacitively coupled radiator comprise the antenna circuit for the detection system. Impedance changes in the antenna circuit are sensed in one embodiment of the invention by a diode detector connected to the center conductor of the coaxial line resonator near the point of maximum voltage. Variations from the steady state DC level produced by a moving object are coupled through a capacitor to a high gain amplifier. The amplified signal is then used to actuate the alarm means.

The above mentioned objects and other objects and features of the present invention will best be understood from a detailed description of a preferred embodiment thereof, selected for purposes of illustration, and shown in the accompanying drawings, in which.

Figure 1:
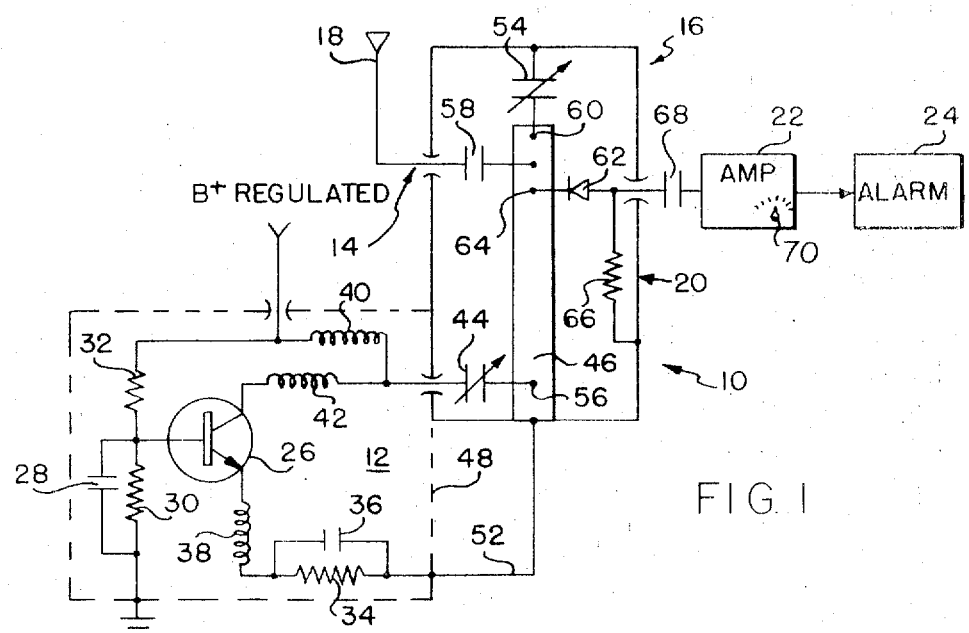
FIG. 1 is a partial schematic and block diagram of the alarm system showing the oscillator, coaxial line resonator, radiator, detector, amplifier and alarm means.

Turning now to the drawings, and particularly to FIG. 1 thereof, there is shown in partial schematic and block diagram, one embodiment of the alarm system of the present invention indicated generally by the reference numeral 10. For purposes of discussion, the alarm system can be divided into five major functional units: (1) a continuous wave oscillator 12; (2) an antenna circuit 14 comprising a coaxial line resonator 16 and a radiator 18; (3) an impedance sensing means 20; (4) an amplifier 22; and, (5) alarm means 24. Each of these major functional units will be discussed below in detail.

The solid-state oscillator 12 produces sinusoidal continuous wave oscillations at a frequency of approximately 400 megahertz. It has been found that the three-fourths of a meter wave length of the 400 megahertz radiated signal is particularly suitable for detection of moving human beings. However, it should be understood that the present invention is not limited to a specific frequency, but instead can be used over wide range of frequencies generally in the ultra high frequency band.

A number of different signal generator circuits can be used to produce the necessary continuous waves at a predetermined frequency, including tunable and crystal controlled oscillators. One representative tunable oscillator circuit is illustrated in FIG. 1. A single, grounded base NPN transistor 26 is used to generate the continuous, sinusoidal waves that excite the coaxial line resonator 16. RF ground for the base of transistor 26 is established by a capacitor 28 that shunts base resistor 30. The base resistor 30, together with resistor 32, forms a bias voltage divider from B+ regulated to ground. Emitter resistor 34 provides a DC feedback path for oscillator stabilization while RF feedback is prevented by a shunt capacitor 36 which places an RF ground at the bottom of radio frequency choke 38. Coupling of the radio frequency energy to the power supply (not shown) is prevented by a second radio frequency choke 40 in the collector circuit.

The required inphase RF feedback to sustain oscillation is provided by the collector-base and emitter-base capacitances. The frequency determining components of the oscillator comprise inductor 42, variable capacitor 44, and a portion of the coaxial line center conductor 46. The oscillator frequency is tuned by varying the series capacitance of the frequency determining circuit. This is accomplished by adjusting variable capacitor 44.

The oscillator circuit 12 is shielded by an electromagnetic shield shown by the dashed lines in FIG. 1 and identified by the reference numeral 48. Preferably, the oscillator circuit and coaxial line resonator 16 are constructed on a common chassis so that a portion of the oscillator shield 48 is common to the coaxial line resonator outer conductor 50. However, if the oscillator circuit and the coaxial line resonator are physically separated, a current return path must be provided as shown by line 52.

Coaxial line resonators of the type illustrated in FIG. 1 are now generally classified as "cavity" resonators. Henney, *Radio Engineering Handbook*, 5th Edition, page 6—46. Conceptually, the coaxial line resonator 16 can be regarded as a coaxial transmission line short-circuited at one end and open at the other end. Terman, *Electronic and Radio Engineering*, 4th Edition, pages 159—161. In the present embodiment, the coaxial line resonator is capacitively loaded and tuned by a variable capacitor 54 located at the open end of the line. This location provides the greatest tuning effect per unit of capacitance. However, other tuning methods, including varying the physical dimensions of the "cavity", can be employed to "peak" the coaxial line resonator.

Physically, the coaxial line resonator or cavity can have a true coaxial construction, i.e., inner and outer cylindrical conductors with a common axis, or a hybrid configuration. One possible hybrid configuration is the so-called "trough line" that has a center conductor positioned within a rectangular prism cavity. The same circuit concepts and tuning techniques are applicable to both the cylindrical and rectangular configurations. However, from the standpoint of mechanical fabrication, production line assembly, and component mounting, the rectilinear configuration is preferable. Construction details of the rectilinear "coaxial line" resonator are illustrated in my above-mentioned copending application for Plural Chambered, Oscillator-Coaxial Line Resonator-Detector Assembly for Moving Object Detection Systems.

The term "coaxial line" has been selected to describe the resonator 16 because it connotes a centrally disposed conductor surrounded by one or more conducting surfaces. This is true even though the conducting surfaces may define a rectangular cavity rather than a cylindrical cavity. Therefore, as used herein, the term "coaxial line resonator" shall mean a resonant cavity having a centrally disposed conductor short-circuited at one end to the conducting surface or surfaces which form the cavity and open at the other end.

The coaxial line resonator 16 has a high FIG. of Merit (Q) which allows the oscillator 12 to be very loosely coupled to the resonator. Coupling of the oscillator to the resonator is controlled by the position of the oscillator tap point 56 along the center conductor 46 of the resonator. The coupling should be as loose as possible within the limits imposed by the desired detection range. It is the loose coupling of the oscillator with the high Q coaxial line resonator circuit that effectively isolates the oscillator from the motion produced impedance changes in the antenna circuit thereby maintaining the frequency stability of the oscillator.

The coaxial line resonator 16 is constructed with the center conductor 46 having a physical length that is less than one-fourth$\lambda$ at the operating frequency. The electrical length of the line is adjusted by varying capacitor 54. The output from the coaxial line resonator is capacitively coupled through capacitor 58 to radiator 18. The radiator, which has a length between one-fourth $\lambda$ and one-half $\lambda$, is voltage fed to achieve maximum detection sensitivity. It can be seen from FIG. 1, that the output from the coaxial line resonator is taken at a point 60 which is very close to the point of maximum voltage on the center conductor 46.

Changes in the impedance of the antenna circuit 14 produced by motion of an object within the radiated field pattern of the alarm system are sensed by a rectifier 62. The rectifier is connected to the center line 46 of the coaxial line resonator at a point 64 located slightly below the output tap 60 for the antenna. The connection point for the rectifier is a compromise between achieving maximum voltage output and minimum effect upon the Q of the coaxial line resonator. A load for the rectifier 62 is provided by resistor 66.

It will be appreciated that in the absence of a moving object, a steady state DC level will be established at the junction of the rectifier 62, load resistor 66 and coupling capacitor 68. This steady state DC level can be used by field service personnel to adjust the object detection system to the particular characteristics of the protection environment and to provide compensation whenever the antenna position is changed.

The alarm system is adjusted to the particular protection environment by tuning the coaxial line resonator to provide a maximum DC level at the output of the rectifier. Frequency tuning of the coaxial line resonator is generally performed for each installation of the alarm system and each time the antenna is moved to a new location. On the other hand, adjustment of the oscillator tuning capacitor 44 is a comparatively infrequent operation and normally does not have to be performed under field conditions.

When an object moves within the radiated field pattern, the reflected and transmitted energy combine in the antenna circuit to produce a new voltage-current ratio or impedance. Fluctuations in amplitude and phase of the combined signals occur as the object moves through the radiated field pattern. These fluctuations produce an alternating current at the output of the rectifier which rides on the steady state DC voltage. The alternating current or "alarm signal" is coupled through capacitor 68 to the high gain, low frequency amplifier 22. In the preferred embodiment of the present invention, the amplifier 22 has a gain of unity at DC and a gain of 2500 at 1 hertz. The band width of the amplifier is 0.5 hertz to 3.0 hertz (3 db. points) with no gain at 35 hertz.

The detection range of the alarm system can be controlled in a number of known ways. For instance, a variable threshold level can be set for the amplifier input signal. Alternatively, the gain of the amplifier can be varied so that only certain amplitude motion signals will provide a sufficient output signal to activate the alarm means 24. The range control is illustrated representationally in the FIGS. by an adjustable knob 70.

Figure 2:
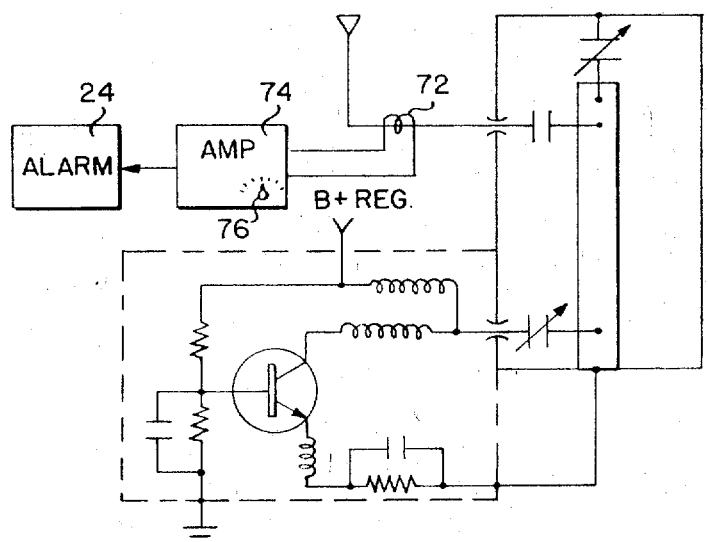
FIG. 2 is a partial schematic and block diagram of another embodiment of the alarm system which utilizes changes in the RF antenna current to activate the alarm means; and, FIG. 3 is a partial schematic and block diagram of the alarm system employing a crystal controlled oscillator and a phase comparison circuit to sense impedance changes in the antenna circuit.

Another embodiment of the invention which utilizes changes in the RF antenna current to sense the presence of a moving object within the radiated field pattern of the alarm system is illustrated in FIG. 2. A sample of the antenna current is obtained from a pickup loop 72 that is electromagnetically coupled to the radiator 18. The induced RF current in pickup loop 72 is fed to an amplifier 74 that has a range control 76 of the type described above. If the RF antenna current varies from a preselected level as a result of an object moving within the radiated field pattern, the amplified current variation activates alarm means 24.

Figure 3:
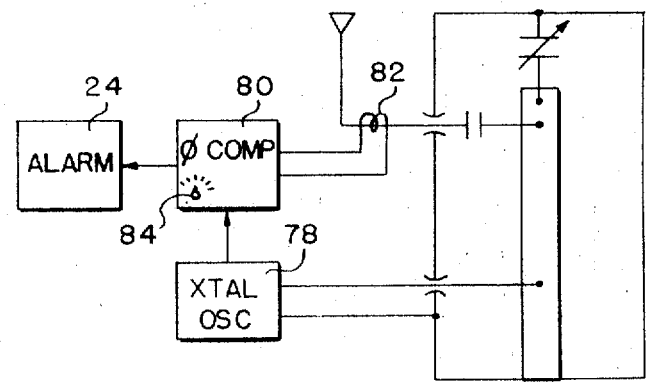

FIG. 3 depicts an alternative embodiment of the present invention having a crystal controlled oscillator 78 and a phase comparator 80 which senses impedance changes in the antenna circuit produced by moving objects. It has already been mentioned that the phase of the combined received-transmitted signal varies as the object moves through the radiation field pattern of the detection system. The variable phase combined signal input to the phase comparator 80 is obtained from a pickup loop 82 while the reference signal is taken from the crystal controlled oscillator 78. For steady state conditions without a moving object, the phase comparator can be nulled or set for a predetermined phase angle by adjusting a phase control which is diagrammatically represented in FIG. 3 by knob 84. Any change from the null condition or preset phase difference produces an output signal that activates alarm means 24.

The crystal controlled oscillator 78 also can be used with the rectifier and current sensing means depicted in FIGS. 1 and 2, respectively. The preferred sensing means for both the tunable oscillator 12 and the crystal controlled oscillator 76 is the rectifier circuit because of its simplicity and low cost.

The crystal controlled oscillator can be employed advantageously in situations where the frequency of the radiated signal must be held within relatively narrow limits. If strict frequency control is not mandatory, the less expensive tunable oscillator 12 can be used to generate the required sinusoidal continuous waves.

Having described in detail a number of embodiments of the present invention, it will be appreciated that the essence of the moving object detection system is the coaxial line resonator. Compared to existing systems of the same general type, the moving object detection system described herein provides greater sensitivity at reduced power levels, effectively isolates the signal generator from impedance changes in the antenna circuit, reduces interference from spurious transmissions, and allows the use of a crystal controlled oscillator in impedance sensing systems. To those skilled in the art, it will be obvious that numerous modifications can be made in the system without departing from the scope of the present invention.

What I claim and desire to secure by Letters Patent of the United States is:

1. In an electromagnetic moving object detection system, the combination comprising:
    an antenna circuit comprising a radiator and a coaxial line resonator coupled to said radiator, said radiator and coaxial line resonator both being used during transmission and reception;
    means for tuning said resonator;
    a continuous wave signal generator loosely coupled to the center line of said resonator; and,
    means for producing an output signal in response to a change in the impedance of said antenna circuit.

2. The moving object detection system of claim 1 wherein said signal generator is a tunable oscillator.

3. The moving object detection system of claim 1 wherein said signal generator is a crystal controlled oscillator.

4. The moving object detection system of claim 1 further characterized by said output signal means producing an electrical signal having a characteristic which varies in accordance with changes in the impedance of said antenna circuit.

5. The moving object detection system of claim 1 further characterized by alarm means responsive to said output signal.

6. The moving object detection system of claim 1 wherein said output signal producing means comprises a rectifier connected to said antenna circuit and a load for said rectifier.

7. In an electromagnetic moving object detection system, the combination comprising:
    a radiator;
    a cavity resonator having a centrally disposed conductor short-circuited at one end to the conducting surface or surfaces which form the cavity and open at the other end;
    means for tuning said cavity resonator;
    means for coupling said resonator and radiator to provide a voltage feed for said radiator, said radiator and cavity resonator both being used during transmission and reception;
    a continuous wave signal generator loosely coupled to the centrally disposed conductor of said resonator;
    a rectifier connected to said centrally disposed conductor;
    load means for said rectifier;
    a low frequency amplifier capacitively coupled to said rectifier; and,
    alarm means connected to the output of said amplifier.